Dec. 27, 1960   J. L. WRIGHT   2,966,046
COMBINATION EVAPORATIVE COOLER AND ICE BOX
Filed Dec. 29, 1958
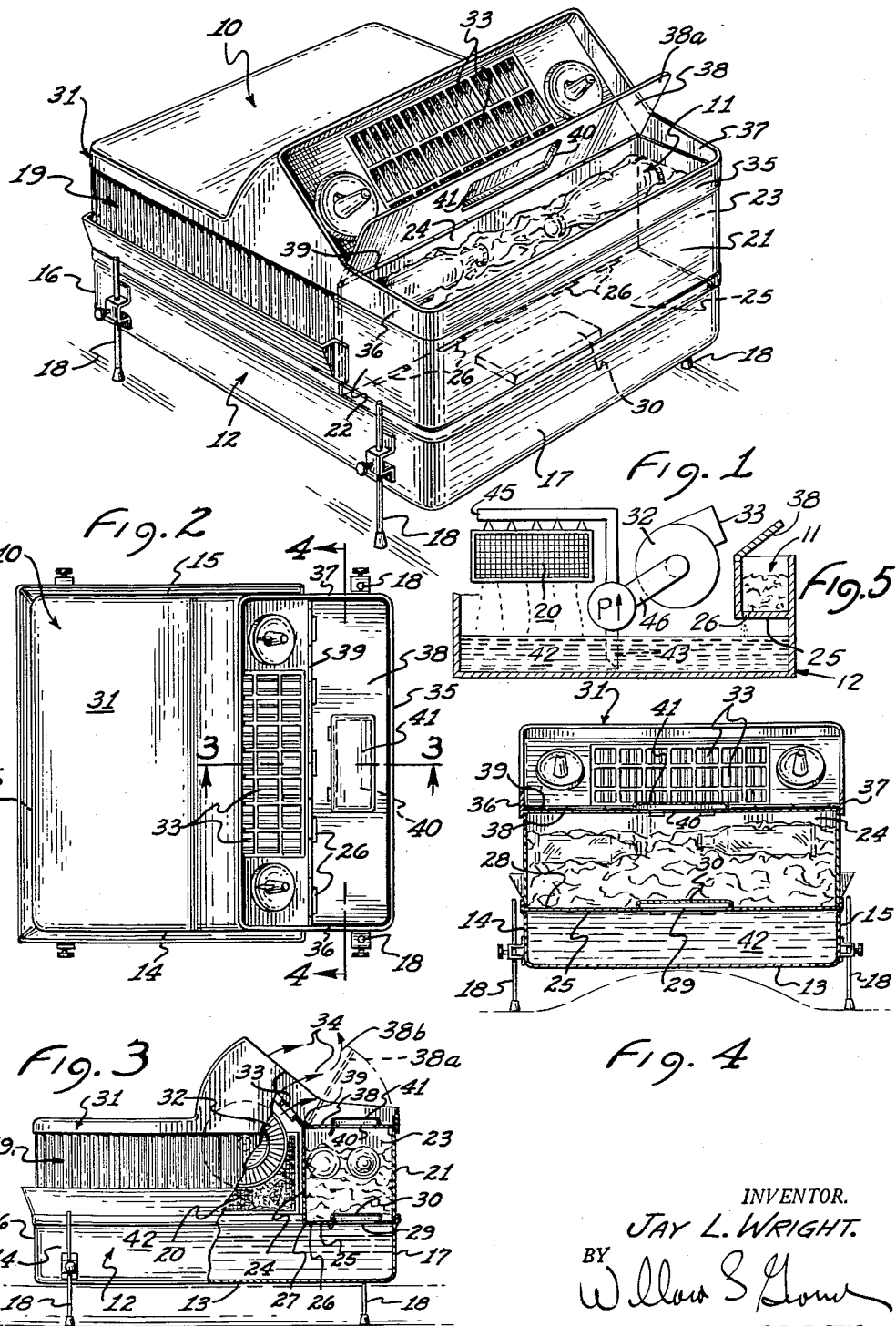
INVENTOR.
JAY L. WRIGHT.
BY
ATTORNEY.

2,966,046

COMBINATION EVAPORATIVE COOLER AND ICE BOX

Jay L. Wright, Phoenix, Ariz., assignor to Wright Mfg. Company, Phoenix, Ariz., a corporation of Arizona Filed Dec. 29, 1958, Ser. No. 783,590

4 Claims. (Cl. 62—312)

This invention pertains to a combination evaporative cooler and ice box and is particularly directed to a portable evaporative automobile cooler having an ice box or ice compartment for the cold storage of food and beverage in traveling.

One of the objects of this invention is to provide an evaporative cooler with a cold storage compartment.

Another object of this invention is to provide an evaporative cooler for an automobile having a cooled food and beverage storage compartment combined therewith which is conveniently located to persons in the front seat of the automobile.

A still further object of this invention is to provide a portable evaporative cooler with an iced cooling compartment which is functionally interrelated with the operating and cooling functions of the cooler.

Further features and advantages of this invention will appear from a detailed description of the drawings in which:

Fig. 1 is a perspective view of a combination evaporative cooler and ice box incorporating the features of this invention.

Fig. 2 is a plan view of the device shown in Fig. 1.

Fig. 3 is a left hand side elevation, partly broken away and shown in section on the line 3—3 of Fig. 2.

Fig. 4 is a sectional view on the line 4—4 of Fig. 2.

Fig. 5 is a diagram showing the general arrangement of the apparatus incorporating the features of this invention.

As an example of one embodiment of this invention there is shown an evaporative cooler 10 having an ice box compartment 11 which may take the form of a portable evaporative automobile cooler having the usual bottom reservoir member 12 comprising a bottom 13, sides 14 and 15 and the ends 16 and 17. Suitable legs 18 mounted adjustably on the sides 14 and 15 provide means to mount the cooler unit on the floor of the motor vehicle intermediate the ends of the front seat thereof.

On the top edges of the sides 14 and 15, and the ends 16 and 17 of the bottom reservoir member or pan 12 is the louver panel frame 19 carrying the usual evaporative pads 20 supplied with water from the reservoir number 12 in the customary manner as by a pump P, Fig. 5, having a suction pipe 43 receiving a supply of water 42 from the reservoir 12 and discharging through the usual manifold 45 down over the pad 20 from which the water drips back into the reservoir. The pump P may be suitably driven from the motor driven blower 32 as by a shaft 46 or other conventional power transmission means. The front portion of this louver panel frame is provided with a solid front panel 21 and connected solid side panels 22 and 23 extending rearwardly to the intermediate vertically disposed solid panel 24 forming the rear wall of the ice box compartment 11. A solid floor piece 25 is connected to the lower edges of the front panel 21, side panels 22 and 23, and the intermediate panel 24. Slit drain openings 26 are provided between the bottom edge 27 of the intermediate panel 24 and the top surface 28 of the floor piece 25 which allow melted ice to drain into the main reservoir while preventing air being sucked from the ice box compartment by the blower 33 when lid 38 is raised. A discharge opening 29 having a swinging and removable cover 30 is provided on the floor piece 25.

On the top edges of the louver panel frame 19 is mounted the top cover and blower housing assembly 31 having the usual motor driven blower 32 and the air discharge louvers 33 discharging air in the direction indicated by the arrows 34. The top cover 31 has a front frame portion 35—36—37 forming the upper portion of the ice box compartment 11. A lid 38 is hinged at 39 so as to be raised manually to access position 38a, Figs. 1 and 3, or lowered to position shown in Figs. 2 and 4, so as to provide the top closure for the compartment 11. An access opening 40 covered by a hinged cover 41 provides means for adding water to the compartment 11 and through the slit drain openings 26 into the reservoir 12 without raising the lid 38 as when using the unit without charging the ice box compartment 11.

In operation: Ice cubes or crushed ice is placed in the ice box compartment 11 along with food and beverages to be kept cold, with lid in raised position 38a, and the lid 38 then closed down over the compartment 11. The discharge opening 29 at this time is closed by the cover 30. As the ice melts, the water thus formed drains off through the slit drain openings 26 and drips down into the regular supply of water 42 in the bottom reservoir member 12, cooling the water 42 and thereby increasing the cooling effectiveness of the air discharging at 34. It will be noted that, with lid 38 in horizontal closed position shown in Figs. 2 and 4, the cool air issuing at 34 protects and keeps direct hot ambient air from the top of the compartment 11, further increasing the cooling capacity and duration of melting of the ice in the compartment 11. Thus it will be noted that the ice compartment 11 simultaneously cools the food and beverage therein and at the same time cools the evaporative water in the reservoir 12. Further, cool air discharged from the unit is directed over the ice box compartment to increase its efficiency and protect it from the warm ambient air temperatures in the vehicle. With the lid 38 raised to access position 38a, Figs. 1 and 3, air from grille 33 will be deflected at 38b upwardly by the raised lid so that it does not scavenge the cold air out of the ice box compartment when putting in or taking out food from it. And it will be further noted that the lift up cover 38 is placed for convenient accessibility to the contents in the compartment 11 for passengers in the front seat of the automobile.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An evaporative cooler comprising, a bottom water reservoir member including, a horizontal bottom and upstanding sides and ends formed integral with said bottom, a louver panel frame having evaporative pads therein mounted on the top edges of said sides and ends of said bottom reservoir, means to convey water from said reservoir member to said evaporative pads, an ice box compartment formed in said louver panel frame above the front portion of said bottom reservoir member by a solid front panel and connected solid side panels of said frame extending rearwardly to an intermediate vertically disposed solid panel formed in said frame providing the rear wall of said ice box compartment, a solid floor piece formed integral with the lower edges of said front panel, side panels and intermediate panel, melted ice drip openings in the bottom of said ice box compartment discharging water into said bottom reservoir member, a top cover and blower housing assembly including, a motor driven blower mounted on the top of said louver panel frame, and a rearwardly and upwardly sloping air discharge louver having its lower edge located above the top edge of said intermediate panel, a front frame portion formed integral with said top cover and blower housing assembly extending forwardly from the lower edge of said air discharge louver to form the top solid closure for said ice box compartment, and a manually raisable solid lid hinged to said front frame portion adjacent the lower edge of said air discharge louver to provide access to said ice box compartment while preventing air discharge from said louver, when said lid is in the raised position, from entering said ice box compartment.

2. An evaporative cooler as set forth in claim 1 wherein the discharge from said air discharge louver is directed over said lid when in the horizontal closed position and said ice box compartment to shield said compartment from ambient air temperature during the operation of said evaporative cooler.

3. An evaporative cooler as set forth in claim 2 wherein the melted ice water discharge from said ice box compartment is received by the water in the bottom reservoir member to facilitate cooling said reservoir water supply, said melted ice drip openings to be so proportioned as to prevent circulation of air by said blower through contents in said ice box compartment when said solid lid is raised.

4. An evaporative cooler having a fluid supply reservoir means to convey fluid from said reservoir to said evaporative pads, evaporative pads above said reservoir, a blower arranged to draw air through said pads, a totally enclosed ice box compartment above said reservoir, melted ice discharge outlets in said ice box compartment discharging into the fluid supply in said reservoir, a solid access lid manually swingable on said ice box compartment to and from a closed position, an air discharge louver on said cooler connected to the discharge from said blower adapted to blow air over the top of said lid when in horizontal closed position to protect said ice box compartment from exposure to ambient temperature, said lid being adapted when manually raised to the open position to deflect the discharge of air from said louver upwardly away from the exposed access opening of the top of said ice box compartment to prevent scavenging of the cold air therefrom.

References Cited in the file of this patent
UNITED STATES PATENTS

| | | |
|---|---|---|
| 1,394,924 | Macffadden | Oct. 25, 1921 |
| 1,903,137 | Reiss | Mar. 28, 1933 |
| 2,031,055 | McKinney | Feb. 18, 1936 |
| 2,104,119 | Forbush | Jan. 4, 1938 |
| 2,891,390 | Schaupp | June 13, 1959 |

UNITED STATES PATENT OFFICE
CERTIFICATE OF CORRECTION

Patent No. 2,966,046                      December 27, 1960

Jay L. Wright

It is hereby certified that error appears in the above numbered patent requiring correction and that the said Letters Patent should read as corrected below.

Column 4, line 3, after "reservoir" insert a comma; lines 4 and 5, strike out "means to convey fluid from said reservoir to said evaporative pads," and insert the same after "reservoir," in line 5, same column 4.

Signed and sealed this 21st day of November 1961.

(SEAL)
Attest:

ERNEST W. SWIDER
Attesting Officer

DAVID L. LADD
Commissioner of Patents
USCOMM-DC